US012798306B2

(12) United States Patent
Slinkard et al.

(10) Patent No.: US 12,798,306 B2
(45) Date of Patent: Nov. 17, 2026

(54) ANTI-RATTLE DEVICE FOR A TRAILER HITCH ASSEMBLY

(71) Applicant: Etrailer Corporation, Wentzville, MO (US)

(72) Inventors: Gene Ray Slinkard, Bernie, MO (US); Craig Michael Obermark, Union, MO (US); Corry Alan Blackburn, St. Louis, MO (US)

(73) Assignee: Etrailer Corporation, Wentzville, MO (US)

(*) Notice: Subject to any disclaimer, the term of this patent is extended or adjusted under 35 U.S.C. 154(b) by 358 days.

(21) Appl. No.: 18/654,760

(22) Filed: May 3, 2024

(65) Prior Publication Data

US 2025/0340088 A1 Nov. 6, 2025

(51) Int. Cl.
*B60D 1/24* (2006.01)
*B60D 1/52* (2006.01)

(52) U.S. Cl.
CPC ................ *B60D 1/241* (2013.01); *B60D 1/52* (2013.01)

(58) Field of Classification Search
CPC .................................. B60D 1/241; B60D 1/52
USPC .......................................................... 280/506
See application file for complete search history.

(56) References Cited

U.S. PATENT DOCUMENTS

| | | | | |
|---|---|---|---|---|
| 6,105,989 | A | 8/2000 | Linger | |
| 7,823,904 | B2 * | 11/2010 | Coy | B60D 1/06 280/505 |
| 11,465,458 | B1 * | 10/2022 | Dolinskiy | B60D 1/241 |
| 2001/0038191 | A1 * | 11/2001 | Massey | B60D 1/46 280/490.1 |
| 2004/0195802 | A1 * | 10/2004 | Allen | B60D 1/52 280/491.5 |
| 2007/0052206 | A1 * | 3/2007 | Ezra | B60D 1/52 280/506 |

* cited by examiner

*Primary Examiner* — Jacob D Knutson
(74) *Attorney, Agent, or Firm* — Sandberg Phoenix & von Gontard, P.C.

(57) ABSTRACT

An anti-rattle device for a trailer hitch assembly is mechanically attachable to a receiver tube of the trailer hitch assembly and remains attached to the receiver tube both when a shank of the trailer hitch assembly is inserted into the receiver tube and the shank is removed from the receiver tube. With the device attached to the receiver tube the shank is inserted through the device and into the receiver tube. The device can then be manually adjusted to push the shank in the receiver tube downward against a bottom interior surface of the receiver tube and to one side against a side interior surface of the receiver tube and thereby eliminate rattle between the shank and the receiver tube.

20 Claims, 7 Drawing Sheets

ANTI-RATTLE DEVICE FOR A TRAILER HITCH ASSEMBLY

BACKGROUND OF THE INVENTION

A typical trailer hitch assembly is comprised of two primary components, a receiver tube and a shank that is telescopically received inside the receiver tube. In use, the receiver tube is permanently attached to the rearward end of a vehicle. The shank is temporarily attached to the receiver tube. When needed, the shank is inserted into an opening at a rearward end of the receiver tube and is attached to the receiver tube by a pin that is inserted through aligned holes in the shank and the receiver tube. The shank typically has a functional attachment such as a trailer hitch ball mounted on a distal end of the shake from the receiver tube.

To facilitate the insertion of the shank into the opening at the rearward end of the receiver tube, the interior dimensions of the receiver tube opening are slightly larger than the exterior dimensions of the shank. This enables the shank to be easily inserted into the opening at the rearward end of the receiver tube and slid through the interior of the receiver tube.

A problem encountered in the construction of the typical trailer hitch assembly is that the tolerance between the opening at the rearward end of the receiver tube and the shank allows the shank to move in the receiver tube. The shank is allowed to move upward and downward and from side to side in the interior of the receiver tube. This movement of the shank in the receiver tube produces an annoying rattle that can often be heard by occupants of the vehicle to which the trailer hitch assembly is attached.

SUMMARY OF THE INVENTION

The anti-rattle device of this disclosure is designed to be mechanically attached to the rearward end of a receiver tube of a trailer hitch assembly and remain attached to the receiver tube when the shank of the trailer hitch assembly is received in the receiver tube and when the shank is removed from the receiver tube. In use of the anti-rattle device with a typical trailer hitch assembly, the device is attached to the rearward end of the receiver tube and the shank is inserted through the device and into the receiver tube. The device can be quickly and easily manually adjusted to push the shank in the receiver tube downward against the bottom interior surface of the receiver tube and to one side against a side interior surface of the receiver tube. The engagement of the shank against the interior bottom surface and the interior side surface of the receiver tube eliminates rattle between the shank and the receiver tube.

The device comprises a housing that is configured for engagement with the receiver tube of the trailer hitch assembly. The housing has a passage through the housing that is configured to align with the opening in the receiver tube when the housing is engaged with the receiver tube. The passage through the housing is also configured to receive the shank of the trailer hitch assembly inserted through the passage and into the opening in the receiver tube.

The housing has a forward plate with a forward surface on the exterior of the housing. The housing also has an opposite rearward plate with a rearward surface on the exterior of the housing. The forward plate and rearward plate each have an aperture. The apertures are configured to align with each other and define the passage through the housing. The housing has spacer plates between the forward plate and the rearward plate. The spacer plates attach the forward plate and rearward plate together with a spacing between the plates.

A pair of first and second clamps are provided on the forward surface of the housing. The clamps are operable to engage with opposite sides of the receiver tube and attach the housing to the receiver tube.

A slide plate is positioned in the spacing between the forward plate and the rearward plate. The slide plate is adjustably movable in the spacing between first and second positions of the slide plate relative to the forward plate and rearward plate and relative to the passage through the housing. The slide plate has an edge surface that is positioned between the forward plate and the rearward plate in the first position of the slide plate and is positioned extending across corners of the apertures through the forward plate and rearward plate in the second position of the slide plate.

A first portion of the edge surface is positioned in the passage through the housing defined by the apertures when the slide plate is in the first position of the slide plate on the housing. A second portion of the edge surface is positioned in the passage through the housing when the slide plate is positioned in the second position of the slide plate on the housing. The second portion of the edge surface is larger than the first portion of the edge surface.

The edge surface of the slide plate is positioned relative to the passage through the housing to engage against the shank inserted through the passage through the housing and into the open end of the receiver tube. The edge surface is positioned to exert a force on the shank in response to the slide plate being adjustably moved from the first position of the slide plate to the second position of the slide plate. The force exerted by the edged surface of the slide plate against the shank has a horizontal component of force and a vertical component of force. The horizontal component of force pushes the shank to one side of the interior of the receiver tube and the vertical component of force pushes the shank downwardly in the receiver tube. This results in the shank engaging against a side interior surface of the receiver tube and engaging against a bottom interior surface of the receiver tube and thereby eliminates rattle caused by movement of the shank in the receiver tube.

The features, functions and advantages of the anti-rattle device for a trailer hitch assembly that have been discussed can be achieved independently in various embodiments or may be combined in yet other embodiments, further details of which can be seen with reference to the following description and drawings.

DETAILED DESCRIPTION OF THE INVENTION

Figure 1:
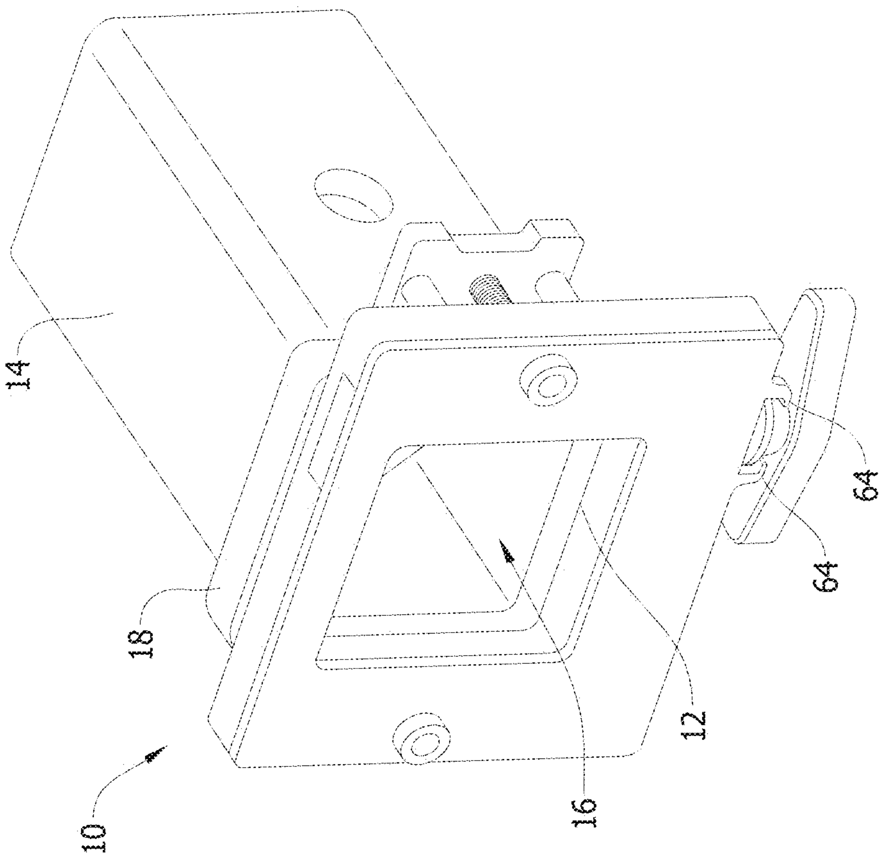
FIG. 1 is a representation of a perspective view of the anti-rattle device attached to the opening end of a receiver tube.

FIG. 1 is a representation of a perspective view of the anti-rattle device 10 for a trailer hitch assembly of this disclosure. The anti-rattle device 10 is represented in FIG. 1 as engaging with and being attached to an open end 12 of a receiver tube 14 of a trailer hitch assembly. The device 10 when attached to the open end 12 of the receiver tube 14 engages over the opening 16 in the receiver tube. More specifically, the device 10 is represented as being attached to the receiver flange 18 that extends around the opening 16 in the open end 12 of the receiver tube 14. The device 10 is constructed of component parts manufactured from materials such as metals, composite materials and other equivalent types of materials that provide the component parts with sufficient structural strength to function in their intended manner to be described.

Figure 3:
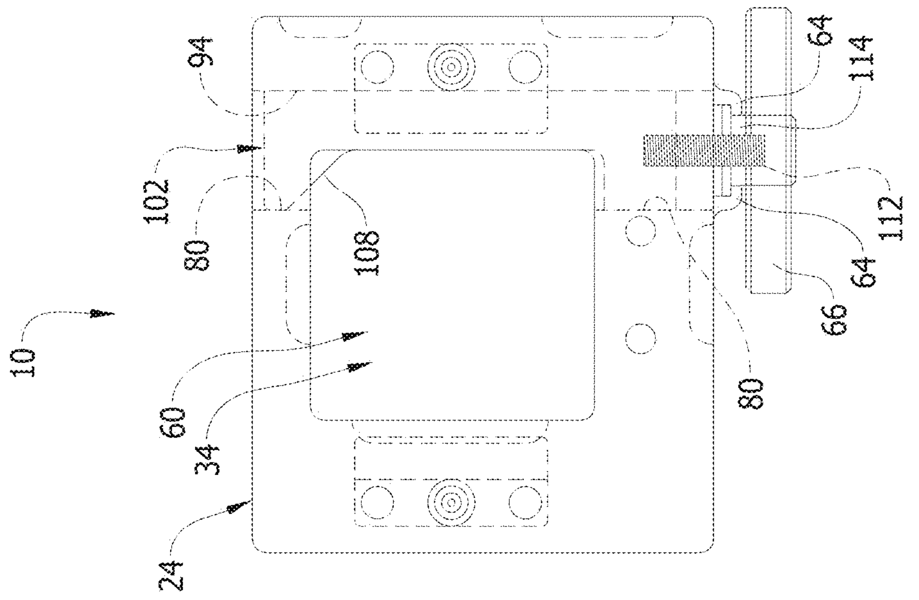
FIG. 3 is an elevation view of the rearward surface of the housing of the device.
Figure 2:
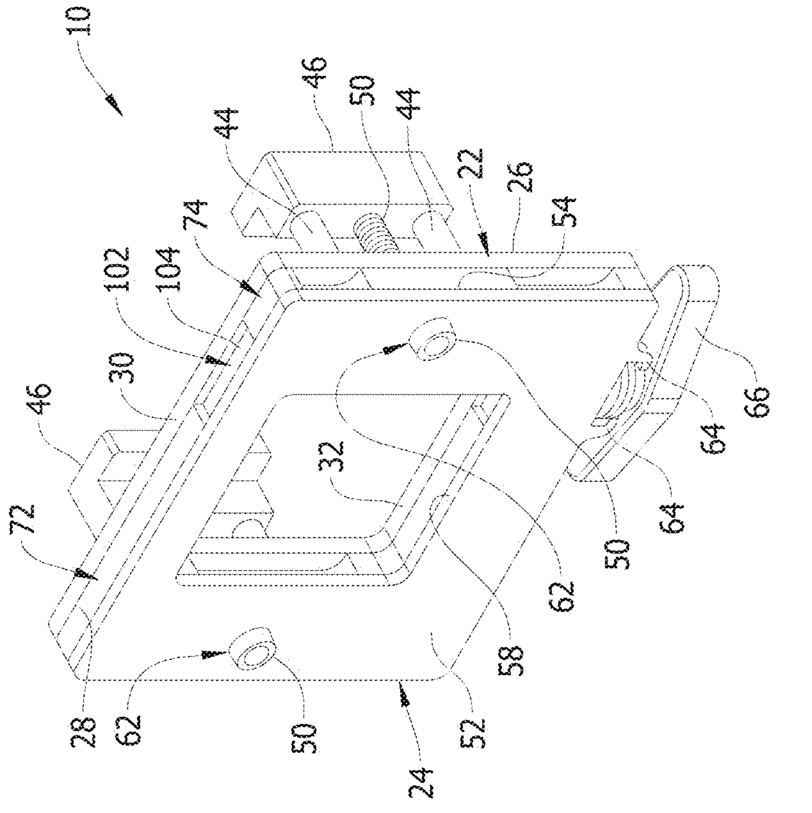
FIG. 2 is a representation of the device of FIG. 1 removed from the receiver tube.
Figure 4:
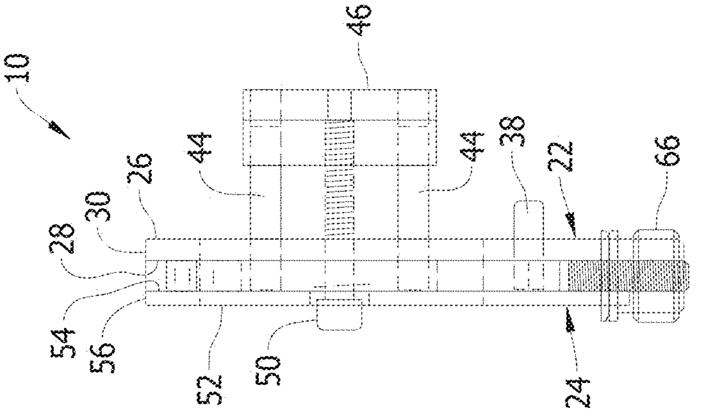
FIG. 4 is an elevation view of the right side of the device of FIG. 3.

FIG. 2 is a representation of a perspective view of the device 10 removed from the receiver tube 14. FIG. 3 is an elevation view of the rear of the device 10 and FIG. 4 is a right side elevation view of the device 10 of FIG. 3. The device 10 has a housing comprised of a forward plate 22 and a rearward plate 24. The forward plate 22 and the rearward plate 24 are flat, planar members that have rectangular peripheral configurations. The configurations of the forward plate 22 and the rearward plate 24 are substantially the same. In use of the device 10 when the device attached to the rearward end of the receiver tube 14, the forward plate 22 is positioned in front of the rearward plate 24.

Figure 5:
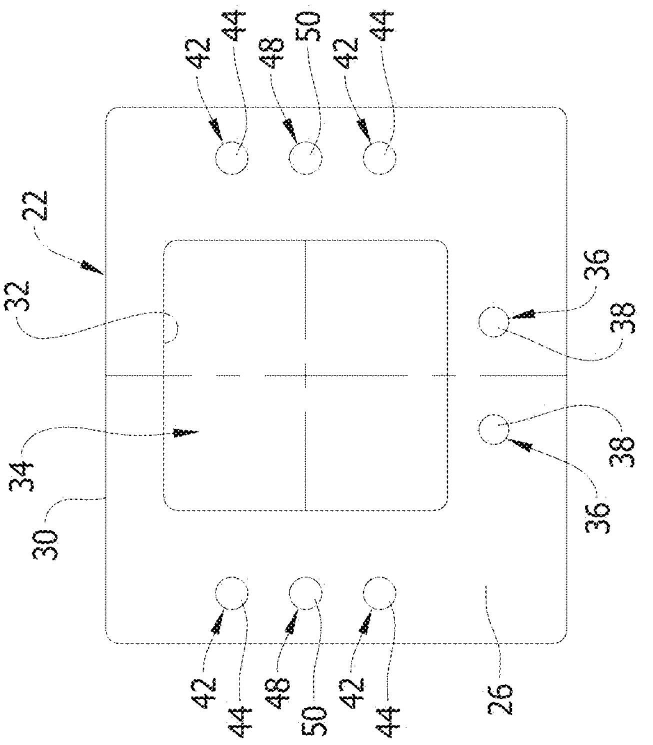
FIG. 5 is an elevation view of the forward surface of a forward plate of the housing of the device.

An elevation view of the forward plate 22 removed from the housing of the device 10 is represented in FIG. 5. The forward plate 22 has a forward surface 26. The forward surface 26 faces forward, toward the receiver tube 14 of the trailer hitch assembly in use and defines an exterior surface of the housing. The forward surface 26 is configured for engagement with the open end 12 of the receiver tube 14. The forward plate 22 has an opposite interior surface 28 that faces toward the interior of the housing of the device 10. The forward plate 22 has an outer edge surface 30 that separates the forward surface 26 from the interior surface 28 and extends completely around the forward plate. The outer edge surface 30 defines the rectangular peripheral configuration of the forward plate. The peripheral configuration of the outer edge surface 30 is dimensioned to be larger than the peripheral configuration of the receiver flange 18. The forward plate 22 has an inner edge surface 32 that extends around an aperture 34 through the forward plate. The inner edge surface 32 gives the aperture 34 a rectangular configuration that is slightly larger than the rectangular configuration of the opening 16 in the open end 12 of the receiver tube 14. The aperture 34 is sufficiently larger than the opening 16 in the receiver tube 14 to allow for misalignment of the anti-rattle device 10 on the receiver tube 14 and to allow for variations in receiver tube interior dimensions.

A pair of positioning dowel holes 36 are provided through the forward plate 22 below the aperture 34. The dowel holes 36 receive and secure a pair of positioning dowels 38. The positioning dowels 38 are used to engage underneath the receiver flange 18 of the receiver tube 14 when positioning the device 10 on the open end 12 of the receiver tube 14 and to align the aperture 34 through the forward plate 22 with the opening 16 in the open end of the receiver tube.

Four guide dowel holes 42 are provided through the forward plate 22 on opposite sides of the aperture 34. The four guide dowel holes 42 receive and secure four guide dowels 44 to the forward plate 22. The four guide dowels 44 extend from the forward surface 26 of the forward plate 22 into a pair of first and second clamps 46. The pair of clamps 46 are positioned on opposite sides of the aperture 34. Each of the clamps 46 slides over two of the guide dowels 44 toward and away from the forward surface 26 of the forward plate 22. The guide dowels 44 position the pair of first and second clamps 46 to engage with opposite sides of the receiver tube 14 and specifically with opposite sides of the receiver flange 18 extending around the open end of the receiver tube when attaching the device 10 to the receiver tube 14. The guide dowels also guide the pairs of clamps 46 when adjusting the clamps to attach the device 10 to the receiver flange 18 on the receiver tube 14.

A pair of adjustment screw holes 48 are also provided through the forward plate 22 on opposite sides of the aperture 34. The pair of adjustment screw holes 48 receive a pair of adjustment screws 50 that extend into the clamps 46. On turning the adjustment screws 50 in opposite directions, the clamps 46 are adjusted toward and away from the forward surface 26 of the forward plate 22.

Figure 6:
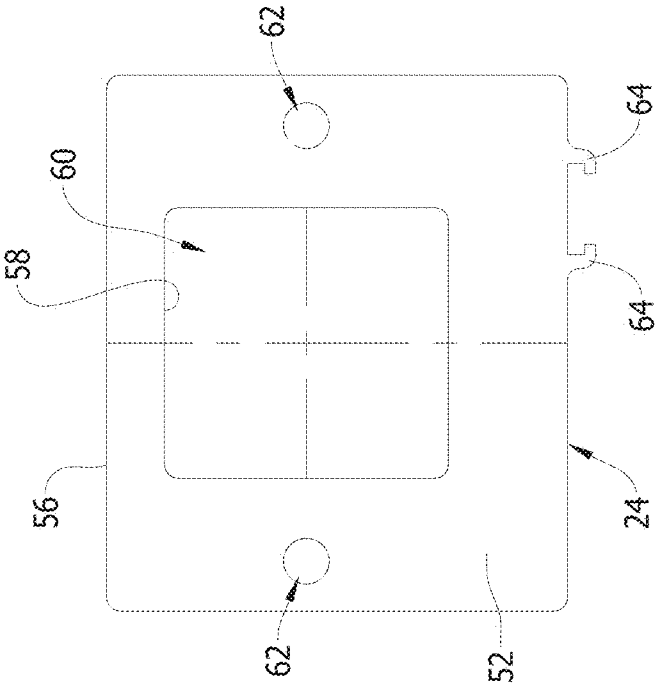
FIG. 6 is an elevation view of the rearward surface of a rearward plate of the housing of the device.

An elevation view of the rearward plate 24 removed from the housing of the device 10 is represented in FIG. 6. The rearward plate 24 has a rearward surface 52. The rearward surface 52 is directed away from the receiver tube 14 of the trailer hitch assembly in use and defines an exterior surface of the housing. The rearward plate 24 has an opposite interior surface 54 that faces toward the interior of the housing of the device 10. The rearward plate 24 has an outer edge surface 56 that separates the rearward surface 52 from the interior surface 54. The outer edge surface 56 extends completely around the rearward plate and defines the rectangular peripheral configuration of the rearward plate. The peripheral configuration of the outer edge surface 56 of the rearward plate 24 is substantially the same as the peripheral configuration of the outer edge surface 30 of the forward plate 22. The rearward plate 24 has an inner edge surface 58 that extends around an aperture 60 through the rearward plate. The inner edge surface 58 gives the aperture 60 a rectangular configuration that is substantially the same as the rectangular configuration of the aperture 34 of the forward plate 22.

A pair of adjustment screw holes 62 are also provided through the rearward plate 24 on opposite sides of the aperture 60. The pair of adjustment screw holes 62 receive the pair of adjustment screws 50 that extend into the clamps 46. As stated earlier, on turning the adjustment screws 50 in opposite directions, the clamps 46 are adjusted toward and away from the forward surface 26 of the forward plate 22. When the clamps 46 are positioned on opposite sides of the receiver flange 18 of the receiver tube 14, turning the adjustment screws 50 in a first direction of rotation adjusts the clamps 46 toward the forward surface 26 of the forward plate 22 and attaches the device 10 to the receiver flange 18 and the receiver tube 14. Turning the adjustment screws 50 in a second opposite direction of rotation adjusts the clamps 46 away from the forward surface 26 of the forward plate 22 and disconnects the device 10 from the receiver flange 18 and the receiver tube 14.

As represented in FIGS. 1, 2, 3 and 6, a pair of hooks 64 extend downwardly from the bottom of the outer edge surface 56 of the rearward plate 24. The pair of hooks 64 are configured to hold an adjustment knob 66 to the bottom of the outer edge surface 56 of the rearward plate 24 as represented in FIGS. 1, 2 and 3, while permitting rotation of the knob 66 relative to the rearward plate.

Figure 7:
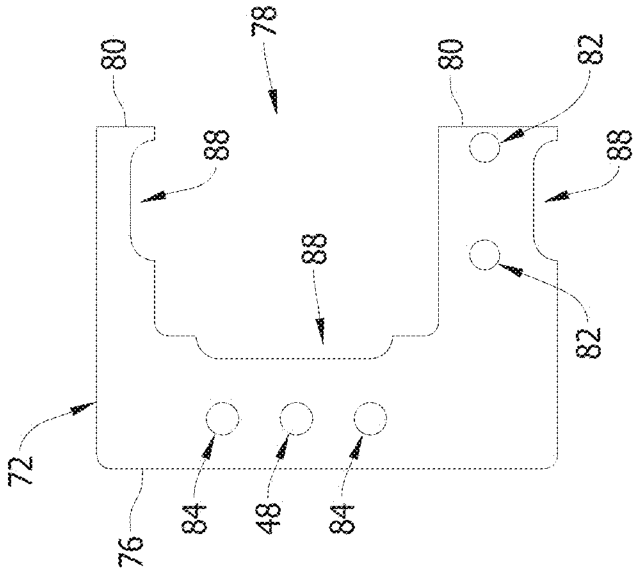
FIG. 7 is an elevation view of a left side spacer plate of the device.
Figure 8:
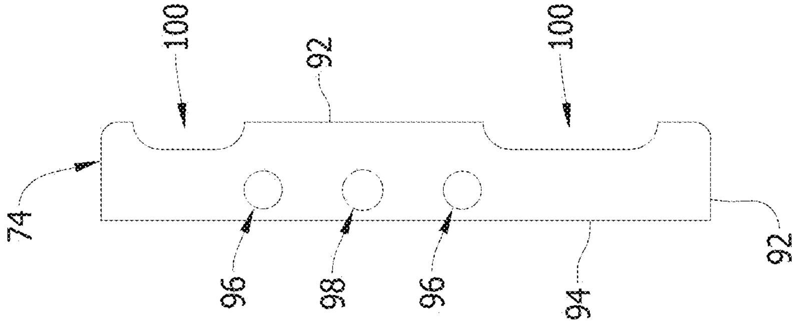
FIG. 8 is an elevation view of a right side spacer plate of the device.

The housing of the device 10 is also comprised of a pair of interior spacer plates 72, 74 represented in FIGS. 7 and 8, respectively. The spacer plates 72, 74 are positioned and secured between the forward plate 22 and the rearward plate 24. The spacer plates include a left side spacer plate 72 and a right side spacer plate 74 shown secured between the forward plate 22 and the rearward plate 24 in FIG. 2.

The left side spacer plate 72 is shown removed from the housing of the device 10 in FIG. 7. As represented in FIG. 7, the left side spacer plate 72 has a general rectangular configuration defined by an outer peripheral edge surface 76. The outer peripheral edge surface 76 aligns with left side portions of the outer edge surface 30 of the forward plate 22 and left side portions of the outer edge surface 56 of the rearward plate 24. The left side spacer plate 72 is also formed with a cavity 78 that aligns with the aperture 34 through the forward plate 22 and with the aperture 60 through the rearward plate 24. A pair of parallel, coplanar sliding surfaces 80 also form portions of the outer peripheral edge surface of the left side spacer plate 72. The sliding surfaces 80 are positioned on opposite sides of the cavity 78 as represented in FIG. 7. The left side spacer plate 72 has dowel holes 82 that align with the dowel holes 36 of the positioning dowels 38, and dowel holes 84 that align with the guide dowel holes 42 of the guide dowels 44. The left side spacer plate 72 is also provided with an adjustment screw hole 48 that enables the adjustments screw 50 to pass through the left side spacer plate 72. The left side spacer plate 72 is secured between the forward plate 22 and the rearward plate 24 by weldments positioned in the notches 88 on the spacer plate. Other equivalent means of securing the left side spacer plate 72 between the forward plate 22 and the rearward plate 24 could be employed.

The right side spacer plate 74 is shown removed from the housing of the device 10 in FIG. 8. As represented in FIG. 8, the right side spacer plate 74 has a general rectangular configuration defined by an outer peripheral edge surface 92. The outer peripheral edge surface 92 aligns with right side portions of the outer edge surface 30 of the forward plate 22 and right side portions of the outer edge surface 56 of the rearward plate 24. A planar, straight sliding surface 94 extends across the right side spacer plate 74 and defines most of the peripheral edge of the spacer plate. The right side spacer plate 74 also has dowel holes 96 that align with the guide dowel holes 42 of the guide dowels 44 and an adjustment screw hole 98 that enables one of the adjustment screws 50 to pass through the right side spacer plate 74. The right side spacer plate 74 is also secured between the forward plate 22 and the rearward plate 24 by weldments positioned in the notches 100 on the spacer plate. Other equivalent means of securing the right side spacer plate 74 between the forward plate 22 and the rearward plate 24 could be employed.

The spacer plates 72, 74 and specifically the opposing slide surfaces 80, 94 of the respective spacer plates 72, 74 create a slot 102 between the plates represented by the dashed lines 80, 94 in FIG. 3. The slot 102 has a rectangular cross section configuration and as represented in FIG. 3, the slot 102 extends vertically through the entire spacing between the forward plate 22 and rearward plate 24. The slot 102 intersects with the aperture 34 in the forward plate 22 and the aperture 60 in the rearward plate 24, and thereby intersects the passage through the housing of the device 10.

Figure 10:
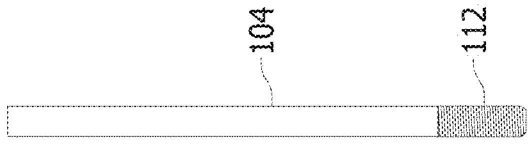
FIG. 10 is a right side elevation view of the slide plate of FIG. 9.
Figure 9:
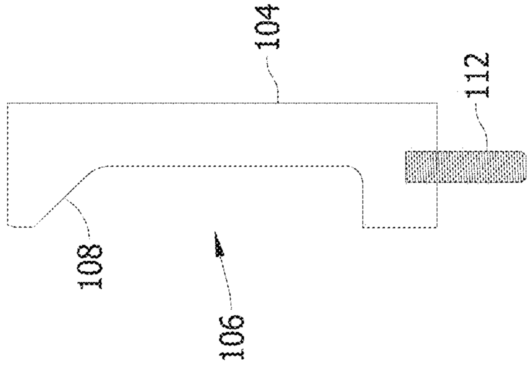
FIG. 9 is an elevation view of a slide plate of the device.
Figure 11:
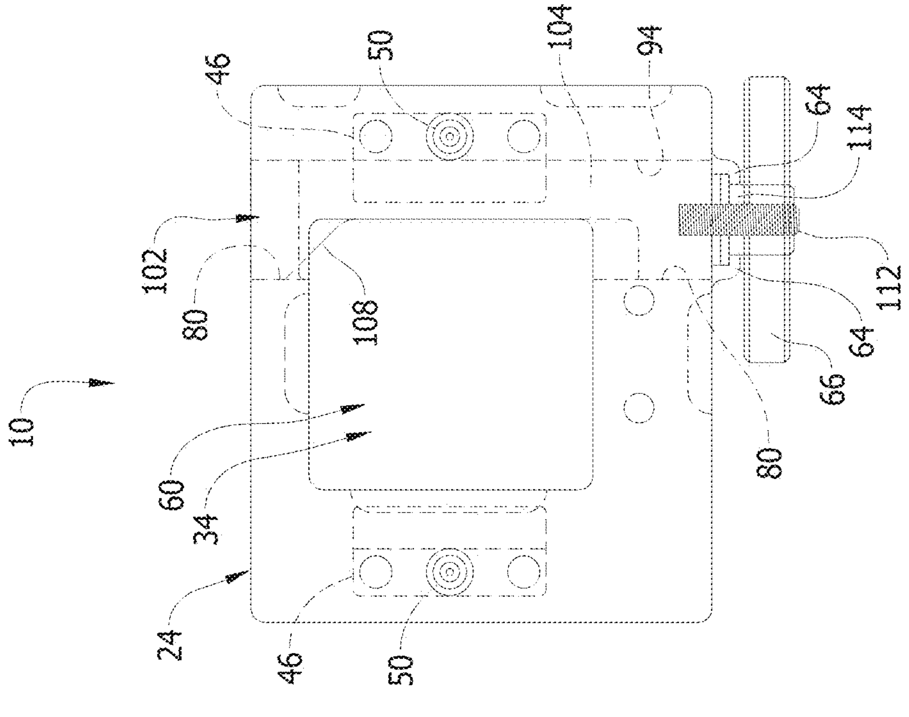
FIG. 11 is an elevation view of the rearward surface of the housing of the device.

A slide plate 104 represented in FIGS. 9 and 10 is received in the slot 102 for sliding movement through the slot. As represented in FIGS. 9 and 10, the slide plate 104 has a general rectangular configuration with an indent 106 in the left side of the slide plate 104 represented in FIG. 9. The indent 106 is configured to match the configurations of the right sides of the apertures 34, 60 as represented in FIGS. 5 and 6, except for an edge surface 108 at the top of the indent 106 as represented in FIG. 9. In the rectangular configurations of the apertures 34, 60 and the rectangular configuration of the passage through the housing of the device 10 defined by the apertures, the edge surface 108 of the slide plate 104 has a linear configuration that extends across the upper right side corner of the rectangular configurations of the apertures 34, 60 as represented in FIGS. 3 and 11. In FIG. 3 the slide plate 104 is adjusted to a first position relative to the forward plate 22 and the rearward plate 24 of the housing of the device 10 where a first portion of the edge surface 108 is positioned between the forward plate 22 and the rearward plate 24 and extends across the upper right hand corner of the passage defined by the aligned apertures 34, 60. In FIG. 11 the slide plate 104 is adjusted to a second position relative to the forward plate 22 and the rearward plate 24 of the housing of the device 10 where a second portion of the edge surface 108 extends across the upper right hand corner of the passage defined by the aligned apertures 34, 60. It can be seen in FIGS. 3 and 11 that the second portion of the edge surface 108 in the passage through the housing of the device 10 represented in FIG. 11 is larger than the first portion of the edge surface 108 in the passage through the housing of the device 10 represented in FIG. 3.

A screw threaded shaft 112 is secured to the bottom of the slide plate 104 and extends downwardly from the slide plate. As represented in FIGS. 3 and 11, the screw threaded shaft 112 extends downwardly from between the forward plate 22 and the rearward plate 24 of the device 10 and between the pair of hooks 64 on the bottom of the rearward plate 24.

The adjustment knob 66 represented in FIGS. 3 and 11 has an actuator in the form of a cylindrical collar 114 containing a screw threaded interior bore. The screw threaded bore of the collar 114 is screw threaded on the shaft 112. The collar 114 is received between the pair of hooks 64. The pair of hooks 64 engage around the collar 114 and enable the knob 66 and the collar 114 to be manually rotated on the threaded shaft 112 while securing the collar 114 and the knob 66 from moving relative to the forward plate 22 and the rearward plate 24. Manually rotating the knob 66 in opposite first and second directions on the threaded shaft 112 causes the shaft 112 to move through the slot 102 and thereby causes the slide plate 104 to move through the slot 102. Rotation of the knob 66 in a first direction causes the threaded shaft 112 to move the slide plate 104 through the slot 102 to the first position of the slide plate relative to the aperture 34 in the forward plate 22 and the aperture 60 in the rearward plate 24 as represented in FIG. 3. In the first position of the slide plate 104 the edge surface 108 on the slide plate is displaced from the shank of a trailer hitch assembly inserted through the passage through the housing of the device 10 defined by the aperture 34 through the forward plate 22 and the aperture 60 through the rearward plate 24. When the slide plate 104 is adjusted by rotation of the knob 66 to move from the first position represented in FIG. 3 to the second position represented in FIG. 11, the edge surface 108 of the slide plate 104 engages against the shank inserted through the passage through the housing of the device 10. As the edge surface 108 engages against the shank as the slide plate 104 is continued to be moved to the second position of the side plate represented in FIG. 11, the edge surface 108 exerts a force on the shank having a horizontal component of force pushing the shank to the left as viewed in FIGS. 3 and 11, and a vertical component of force pushing the shank downwardly as viewed in FIGS. 3 and 11. This causes the shank to engage against a left side interior surface of the receiver tube 14 and engage against a bottom interior surface of the receiver tube 14 and thereby eliminates rattle caused by movement of the shank in the receiver tube.

As various modifications could be made in the construction of the anti-rattle device for a trailer hitch assembly and its method of operation herein described and illustrated without departing from the scope of the invention, it is intended that all matter contained in the foregoing description or shown in the accompanying drawings shall be interpreted as illustrative only rather than limiting. Thus, the breadth and scope of the present disclosure should not be limited by any of the above described exemplary embodiments, but should be defined only in accordance with the following claims appended hereto and their equivalents.

The invention claimed is:

1. An anti-rattle device for a trailer hitch assembly, the device comprising:

a housing configured for engagement with a receiver tube of a trailer hitch assembly, the housing having a passage through the housing that is configured to align with an opening in the receiver tube when the housing is engaged with the receiver tube and to receive a shank of the trailer hitch assembly inserted through the passage through the housing and into the opening in the receiver tube;

a slide plate mounted on the housing for movement of the slide plate between first and second positions of the slide plate relative to the passage through the housing, the slide plate having an edge surface that is displaced from the shank inserted through the passage through the housing and into the opening in the receiver tube when the slide plate is in the first position, and engages against the shank inserted through the passage through the housing and into the opening in the receiver tube when the slide plate is in the second position.

2. The device of claim 1, further comprising:

the passage through the housing having a rectangular cross section configuration; and the edge surface of the slide plate extends across a corner of the rectangular cross section configuration of the passage when the slide plate is in the second position.

3. The device of claim 2, further comprising:

the slide plate edge surface has a linear configuration that extends across the corner of the rectangular configuration of the passage.

4. The device of claim 1, further comprising:

a first clamp and a second clamp on the housing, the first clamp and the second clamp being positioned on the housing on opposite sides of the passage through the housing, the first clamp and the second clamp being operable to engage portions of the receiver tube on opposite sides of the receiver tube when the housing is engaged with the receiver tube to attach the housing to the receiver tube without the shank inserted into the opening in the receiver tube.

5. The device of claim 4, further comprising:

the first clamp and the second clamp being positioned on the housing to engage opposite sides of a receiver flange on the receiver tube that surrounds the opening in the receiver tube.

6. The device of claim 1, further comprising:

the edge surface on the slide plate is positioned relative to the passage through the housing to engage against the shank inserted through the passage through the housing and into the opening in the receiver tube and exert a force against the shank in response to the slide plate moving from the first position of the slide plate relative to the passage to the second position of the slide plate relative to the passage.

7. The device of claim 6, further comprising:

the force exerted by the edge surface of the slide plate against the shank having a horizontal component of force and a vertical component of force.

8. An anti-rattle device for a trailer hitch assembly, the device comprising:

a housing, the housing having a forward surface on an exterior of the housing and an opposite rearward surface on the exterior of the housing, the forward surface being configured for engagement with an open end of a receiver tube of a trailer hitch assembly, the open end of the receiver tube having an opening, the opening being dimensioned for receiving a shank of the trailer hitch assembly into the opening;

a clamp on the forward surface of the housing, the clamp being operable to engage a portion of the receiver tube when the forward surface of the housing is engaged with the open end of the receiver tube and to attach the housing to the receiver tube;

a passage through the housing from the rearward surface to the forward surface, the passage through the housing being configured for aligning with the opening of the open end of the receiver tube in response to the forward surface of the housing engaging with the open end of the receiver tube;

a slide plate on the housing, the slide plate being movable on the housing between a first position of the slide plate on the housing and a second position of the slide plate on the housing; and an edge surface on the slide plate, a first portion of the edge surface being positioned in the passage through the housing when the slide plate is in the first position of the slide plate on the housing and a second portion of the edge surface being positioned in the passage through the housing when the slide plate is in the second position of the slide plate on the housing, the second portion of the edge surface is larger than the first portion of the edge surface.

9. The device of claim 8, further comprising:

the passage through the housing having a rectangular cross section configuration; and the edge surface on the slide plate being positioned in the passage with the edge surface extending across a corner of the rectangular cross section configuration of the passage.

10. The device of claim 9, further comprising:

the edge surface on the slide plate having a linear configuration.

11. The device of claim 10, further comprising:

an actuator mounted on the housing for rotation of the actuator in opposite first and second directions of rotation on the housing, the actuator being operatively connected to the slide plate, the actuator being operable to move the slide plate toward the first position of the slide plate on the housing in response to the actuator rotating in the first direction of rotation and the actuator being operable to move the slide plate toward the second position of the slide plate on the housing in response to the actuator rotating in the second direction of rotation.

12. The device of claim 11, further comprising:

a knob operatively connected to the actuator, the knob being manually rotatable in opposite first and second directions to rotate the actuator in opposite first and second directions of rotation, respectively.

13. The device of claim 8, further comprising:

the clamp being a first clamp of a pair of first and second clamps on the forward surface of the housing, the first and second clamps being positioned on the forward surface of the housing on opposite sides of the passage through the housing, the first and second clamps being operable to engage portions of the receiver tube on opposite sides of the receiver tube and to attach the housing to the receiver tube when the forward surface of the housing is engaged with the open end of the receiver tube.

14. The device of claim 13, further comprising:

the first and second clamps being operable to engage opposite sides of a receiver flange extending around the open end of the receiver tube when the forward surface of the housing is engaged with the open end of the receiver tube and to attach the housing to the receiver tube.

15. The device of claim 8, further comprising:

the edge surface on the slide plate being positioned relative to the passage through the housing to engage against the shank inserted through the passage through the housing and into the opening in the open end of the receiver tube and exert a force on the shank in response to the slide plate moving from the first position of the slide plate to the second position of the slide plate.

16. The device of claim 15, further comprising:

the force exerted by the edge surface of the slide plate against the shank having a horizontal component of force and a vertical component of force.

17. An anti-rattle device for a trailer hitch assembly, the device comprising:

a housing;

the housing having a forward plate, the forward plate having an aperture through the forward plate, the aperture through the forward plate being configured for alignment with an opening through an end of a receiver tube of a trailer hitch assembly;

the housing having a rearward plate, the rearward plate having an aperture through the rearward plate, the aperture through the rearward plate being configured for alignment with the aperture through the forward plate, the aperture through the rearward plate and the aperture through the forward plate defining a passage through the housing, the rearward plate being secured to the forward plate with a spacing between the rearward plate and the forward plate; and a slide plate, the slide plate being positioned in the spacing between the rearward plate and the forward plate, the slide plate being movable in the spacing between the rearward plate and the forward plate between first and second positions of the slide plate relative to the rearward plate and the forward plate, the slide plate having an edge surface that is positioned between the rearward plate and the forward plate in the first position of the slide plate and is positioned in the passage through the housing defined by the aperture of the rearward plate and the aperture of the forward plate in the second position of the slide plate.

18. The device of claim 17, further comprising:

the passage through the housing having a rectangular cross section configuration defined by the aperture through the rearward plate and the aperture through the forward plate; and the edge surface of the slide plate being positioned in the passage through the housing extending across a corner of the rectangular cross section configuration of the passage in the second position of the slide plate.

19. The device of claim 17, further comprising:

the edge surface on the slide plate being positioned relative to the aperture through the rearward plate and relative to the aperture through the forward plate to engage against a shank of the trailer hitch assembly inserted through the passage through the housing and received in the opening in the open end of the receiver tube and exert a force on the shank in response to the slide plate moving from the first position of the slide plate to the second position of the slide plate.

20. The device of claim 17, further comprising:

a first clamp and a second clamp on the forward plate, the first clamp and the second clamp being positioned on the forward plate on opposite sides of the aperture through the forward plate, the first clamp and the second clamp being operable to engage portions of the receiver tube on opposite sides of the receiver tube when the forward plate is engaged with the end of the receiver tube to attach the housing to the receiver tube without the shank inserted into the receiver tube.

* * * * *